(12) United States Patent
Nieto et al.

(10) Patent No.: US 8,059,693 B2
(45) Date of Patent: *Nov. 15, 2011

(54) SYSTEM AND METHOD FOR COMMUNICATING DATA USING CONSTANT RADIUS ORTHOGONAL WALSH MODULATION

(75) Inventors: John W. Nieto, Rochester, NY (US); William N. Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 634 days.

This patent is subject to a terminal disclaimer.

(21) Appl. No.: 12/175,508

(22) Filed: Jul. 18, 2008

(65) Prior Publication Data

US 2010/0014558 A1   Jan. 21, 2010

(51) Int. Cl.
   *H04B 1/00*   (2006.01)
(52) U.S. Cl. .................................................. 375/130
(58) Field of Classification Search .................. 375/130, 375/260, 144, 340, 229
   See application file for complete search history.

(56) References Cited

U.S. PATENT DOCUMENTS

| | | | |
|---|---|---|---|
| 5,406,629 A * | 4/1995 | Harrison et al. ............. 380/34 |
| 7,352,795 B2 | 4/2008 | Furman et al. ............... 375/142 |
| 7,356,088 B2 | 4/2008 | Anim-Appiah et al. ....... 375/265 |
| 2004/0170226 A1* | 9/2004 | Agazzi ........................ 375/260 |
| 2005/0276345 A1 | 12/2005 | Norris et al. .................. 375/265 |
| 2006/0098753 A1 | 5/2006 | Norris et al. .................. 375/265 |
| 2006/0206776 A1 | 9/2006 | Nieto ........................... 714/755 |
| 2006/0215786 A1 | 9/2006 | Nieto et al. ................... 375/305 |
| 2006/0251150 A1 | 11/2006 | Furman et al. ............... 375/146 |
| 2006/0274641 A1 | 12/2006 | Grieco et al. ................. 370/210 |
| 2007/0201584 A1 | 8/2007 | Furman et al. ............... 375/341 |
| 2007/0283211 A1 | 12/2007 | Nieto ........................... 714/755 |
| 2007/0283212 A1 | 12/2007 | Nieto ........................... 714/756 |
| 2008/0043861 A1* | 2/2008 | Moffatt ......................... 375/260 |
| 2008/0192809 A1* | 8/2008 | Kim et al. ..................... 375/144 |
| 2008/0267262 A1* | 10/2008 | Cairns et al. .................. 375/148 |
| 2008/0273614 A1* | 11/2008 | Heegard et al. ............... 375/260 |
| 2009/0290660 A1* | 11/2009 | Neugebauer .................. 375/340 |
| 2010/0177847 A1* | 7/2010 | Woodward ................... 375/296 |

OTHER PUBLICATIONS

Nieto: "*An investigation of Constant-Envelope Variations of OFDM Waveforms for Use on HF Multipath Fading Channels*", Wireless Sensing and Processing III, Proceedings of SPIE, Orlando, USA, vol. 6980, Mar. 17, 2008, pp. 698002-1-698002-12.

Nieto: "*Performance Comparison of Uncoded and Coded OFDMr and OFDM-CDMA Waveforms on HF Muitipath/Fading Channels*", Digital Wireless Communications VII and Space Communication Technologies, Proceedings of the SPIE, Orlando, USA, vol. 5819, Mar. 28, 2005, pp. 77-88.

Madkour et al: "*Multi-rate Multi-code CDMA Using FWT for Mobile and Personal Communications*", The Ninth IEEE International Symposium on Personal, Indoor and Mobile Radio Communications, Boston, USA, 1998, vol. 2, Sep. 8, 1998-Sep. 11, 1998, pp. 779-783.

Thompson et al: "*Constant Envelope Binary OFDM Phase Modulation*", 2003 IEEE Military Communications Conference, MILCOM 2003, Boston, USA, vol, 1. Oct. 13, 2003-Oct. 16, 2003, pp. 621-626.

\* cited by examiner

*Primary Examiner* — David C. Payne
*Assistant Examiner* — Leon-Viet Nguyen
(74) *Attorney, Agent, or Firm* — Allen, Dyer, Doppelt, Milbrath & Gilchrist, P.A.

(57) ABSTRACT

A radio device includes a transmitter having a modulator for generating M-PAM communications symbols containing communications data. A Fast Walsh Transform circuit orthogonally encodes and band-spreads the communications symbols using the Fast Walsh Transform. A frequency modulation circuit frequency modulates the communications symbols wherein a constant radius orthogonal Walsh modulated communications signal containing the communications data is generated.

25 Claims, 6 Drawing Sheets

SYSTEM AND METHOD FOR COMMUNICATING DATA USING CONSTANT RADIUS ORTHOGONAL WALSH MODULATION

FIELD OF THE INVENTION

The present invention relates to communications systems and, more particularly, the present invention relates to communications systems that use constant envelope (CE) waveforms and orthogonal modulation.

BACKGROUND OF THE INVENTION

Some multi-band or other tactical radios operate in the high frequency (HF), very high frequency (VHF) (for satellite communications), and ultra high frequency (UHF) bands, The frequency range of these multi-band tactical radios can operate over about 2 through about 512 MHz. Next generation radios will probably cover about 2.0 to about 2,000 MHz (or higher) to accommodate high data rate, higher bandwidth waveforms and less crowded frequency bands. In the HF frequency band the transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181E, the disclosure which is incorporated by reference in its entirety. This standard provides a family of constant and non-constant amplitude waveforms for use over satellite links.

The joint tactical radio system (JTRS) is one example of a system that implements some of these standards and has different designs that use oscillators, mixers, switchers, splitters, combiners and power amplifier devices to cover different frequency ranges. The modulation schemes used for these types of systems can occupy a fixed bandwidth channel at a fixed frequency spectrum. These systems usually utilize a memoryless modulation, such as phase shift keying (PSK), amplitude shift keying (ASK), frequency shift keying (FSK), quadrature amplitude modulation (QAM), or modulations with memory such as continuous phase modulation (CPM) and may sometimes combine them with a convolutional or other type of forward error correction (FEC) code. Minimum shift keying (MSK) and Gaussian minimum shift keying (GSMK) (together referred to as MSK or GMSK) are a form of continuous phase modulation used in the Global System for Mobile communications (GSM) and can be used with such systems. The circuits used for implementing the MSK waveform could include a continuous phase frequency shift keying (FSK) modulator.

Briefly, an MSK modulated signal can be considered as two combined orthogonal signals or channels that are 90 degrees out of phase with each other. Typically, each phase reversal is keyed to represent alternate bits of a binary signal that is to be transmitted. Each keyed pulse period could have a duration of a two bit period that is staggered by a one bit period, and when binary data is used to modulate each channel, the channels can be amplitude modulated with a positive or negative one-half wave sinusoid and combined by addition. Because the sine shaped envelopes of the two channels are 90 degrees out of phase with each other, the sum of the two channels results in a signal with a constant envelope, which could be amplified by non-linear class-C amplifiers and transmitted. A Gaussian filter having a Gaussian impulse response can be used for prefiltering symbols prior to any continuous phase modulation, thus forming a Gaussian minimum shift keying.

Spread Spectrum (SS) modulation spreads a waveform in frequency and typically provides robust data performance, SS modulation can use underlying orthogonal spreading sequences (i.e., Walsh Hadamard sequences) or pseudo-orthogonal spreading sequences (i.e., sequences obtained from maximum length shift-register sequences, shortened Walsh symbols, overloaded Walsh symbols, gold codes, or others).

Typically, two signals x (t) and y (t) are orthogonal when the average of their product x (t) y (t) equals zero. x (t) and y (t) can be random or Pseudo-random Noise (PN) signals and can be near-orthogonal (i.e., pseudo-orthogonal) with their products being zero in the mean, but sometimes not identically zero for all signal pairs. Any signals transmitted in these spread spectrum system are typically received and decoded and correlated in matched filters and/or signal processors that correlate a correlation function between a reference signal s(t) and the received signal r(t).

One common example of SS orthogonal data modulation is M-ary Walsh modulation. For example, IS-95 uses a 64-ary orthogonal Walsh modulation combined with PSK to send 6 bits of information. By definition, Walsh symbols are a group of M vectors that contain M binary elements in which every Walsh symbol of a given length is orthogonal to all other Walsh symbols of that length and all inverses of the other Walsh symbols of that length. For example, some systems use Walsh symbols having 64 chips to identify the logic channels On both the forward and reverse channels the Walsh symbols have orthogonality. Walsh symbols can be produced using a simple iterative technique utilizing a base Walsh matrix.

In some current high performance radio network systems, it has been found that better performance can be achieved when robust, burst waveforms are used for the control, status and lower data rate data messages within the communications network. Many radio network systems, for example, such as manufactured by the assignee of the present invention, Harris Corporation of Melbourne, Fla., have used orthogonal Walsh modulation schemes to achieve the necessary level of robustness. Most radio frequency (RF) power amplifiers are peak power limited, however. For example, average power transmitted for a filtered SS phase shift keying (PSK) waveform can be several decibels (dB) less than the peak power capability of an RF amplifier because of the back-off required to accommodate the waveform's peak-to-average ratio. A constant amplitude waveform advantageously addresses this issue, but it is also desirable to maintain robustness and provide an adequate level of capacity (bps/Hz).

As known to many skilled in the art, constant amplitude or envelope waveforms are typically required for class C or class E amplifiers used in small handheld or personal radios. These types of power amplifiers are more efficient than the linear class A and class B amplifiers used in other radios. Class C and Class E power amplifiers are generally more efficient than linear RF power amplifiers (i.e., class A, AB, or B). The design challenges when using these types of waveforms is to maintain the constant envelope (CE) while also providing an adequate level of capacity (bps/Hz).

Constant amplitude (or envelope) waveforms are becoming increasingly important for handheld communications devices or radio devices. Gaussian Minimum Shift Keying (GMSK) and similar waveform variations used by those skilled in the art often are the basis for many radio waveforms used in such devices, but their communications are limited typically to one (1) bps/Hz. Performance issues, however, often cancel any gains resulting from the use of constant envelope waveforms, especially in smaller battery operated radios often used in a military or some commercial environments.

SUMMARY OF THE INVENTION

A radio device includes a transmitter having a modulator for generating M-PAM communications symbols containing communications data. A Fast Walsh Transform circuit orthogonally encodes and band-spreads the communications symbols using the Fast Walsh Transform. A frequency modulation circuit frequency modulates the communications symbols wherein a constant radius orthogonal Walsh modulated communications signal containing the communications data is generated.

A square root raised cosine filter is operative before the frequency modulation circuit and band-limits a signal containing the communications symbols. The modulator could generate binary or multi-level M-PAM communications signals. An up-sampling circuit receives the signal from the Fast Walsh Transform circuit and increases the sampling rate on the signal containing the communications symbols.

In another aspect, a receiver unit receives the constant radius orthogonal Walsh modulated communications signal having communications symbols containing communications data and includes at least one of a phase demodulator circuit for phase demodulating the received signal, a phase unwrap circuit for phase unwrapping the received signal and a Fast Walsh Transform circuit for performing a Fast Walsh Transform as a demodulator matched filter to obtain any communications data. The receiver can include a multi-user detection circuit for applying standard or iterative multi-user detection algorithms to the received signal. A feedback loop can extend from the multi-user detection circuit for iterative processing. It can also include a frequency domain equalizer circuit and a circuit for oversampling the received signal.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
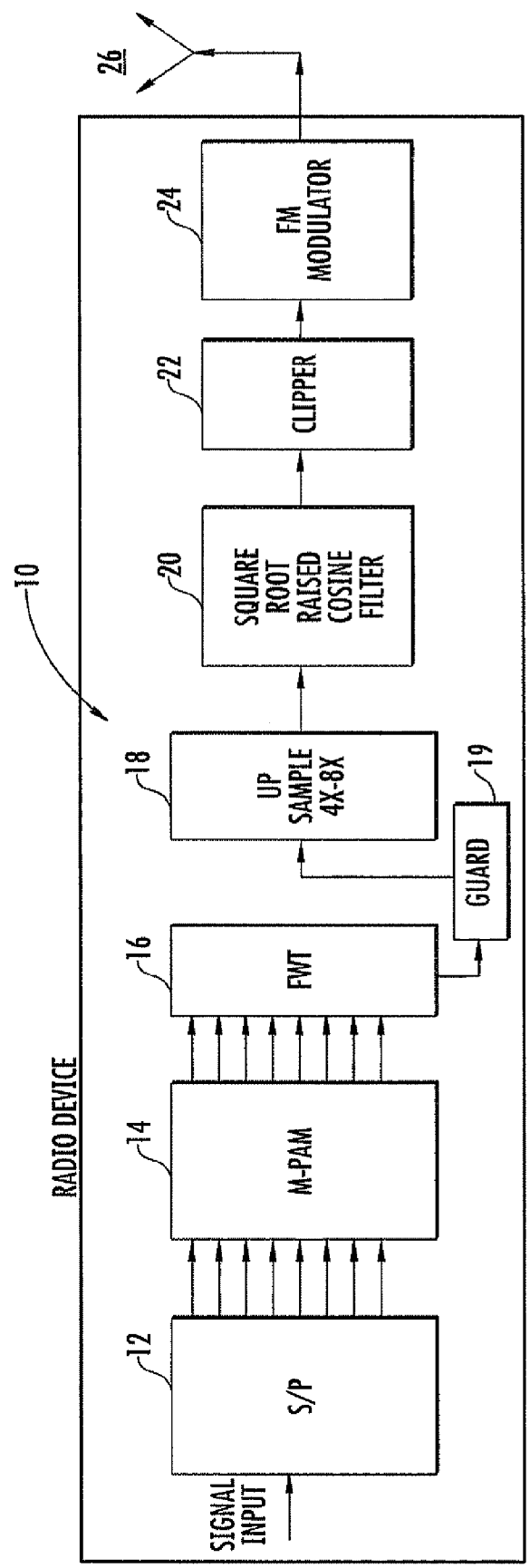
FIG. 1 is a block diagram showing basic processing components used in a transmitter for the constant radius orthogonal Walsh modulation in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Eluetooth, Wideband Code Division Multiple Access (WCDMA), Wireless LAN (WLAN), Ultra Wideband (UWB), coaxial cable, radar, optical, etc. Further, the invention is not limited for use with a specific physical layer (PHY) device or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 2:
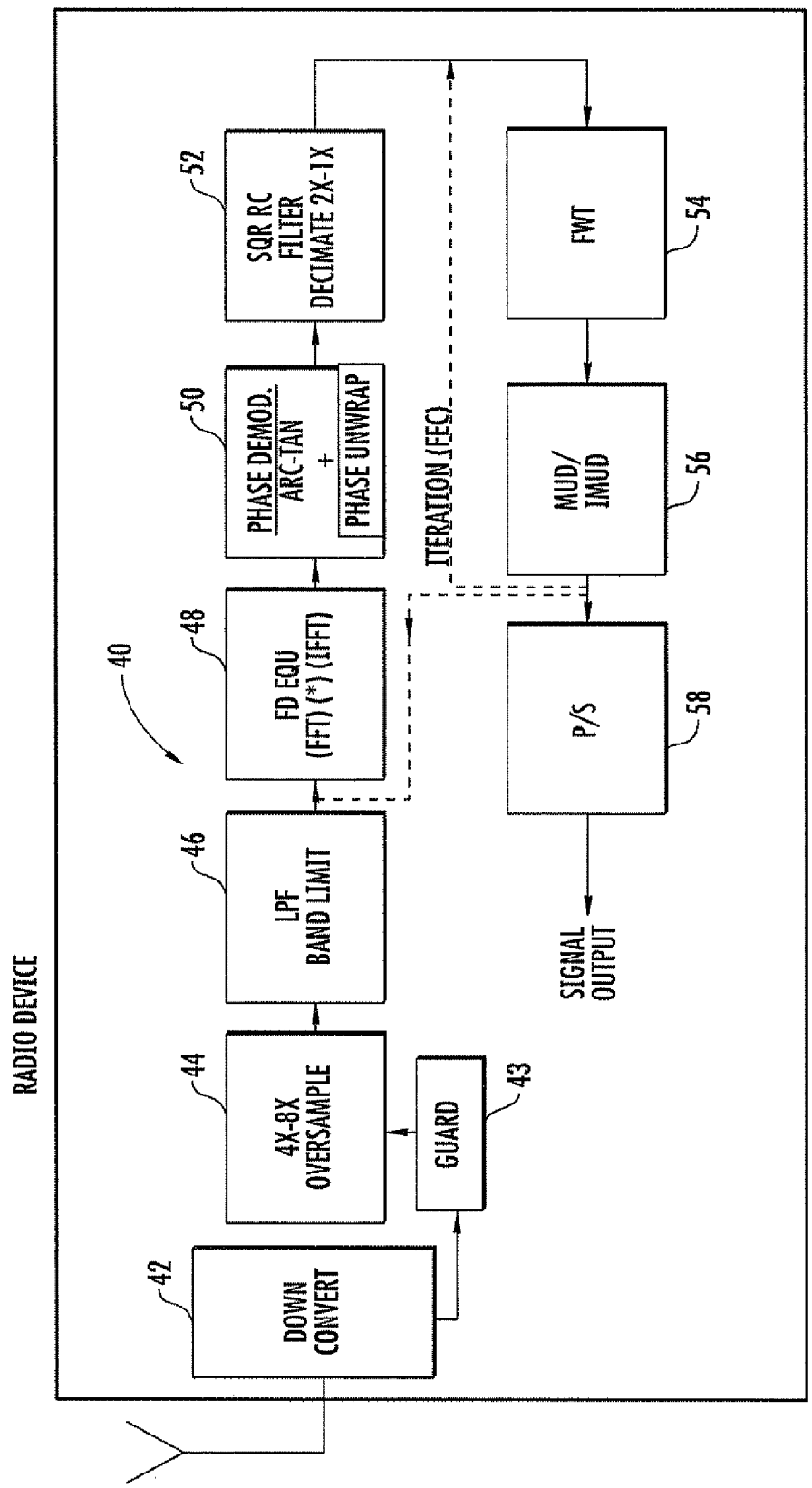
FIG. 2 is a block diagram showing basic processing components used in a receiver for the constant radius orthogonal Walsh modulation in accordance with a non-limiting example of the present invention.

FIG. 1 is a block diagram showing basic processing modules of a radio device shown by the solid outline and the transmitter unit and illustrated at 10 and used for the constant radius orthogonal Walsh modulation in accordance with a non-limiting example. The term constant envelope can also be applied since they convey the same idea (i.e. a constant envelope waveform is displayed as a circle with constant radius when the amplitude of waveform is plotted as the real part of waveform versus the imaginary part of waveform). The radio device typically includes a receiver unit such as shown in FIG. 2. The transmitter unit 10 as shown in FIG. 1 in one non-limiting example is based on Constant Envelope-Orthogonal Frequency Division Multiplexing (CB-OFDM) without the OFDM portion. By using a Fast Walsh Transform, the data is spread more evenly over all frequencies instead of having discrete tones spread by the frequency modulator as in a CE-OFDM system. The transmitter unit 10 preferably uses M-PAM (Pulse Amplitude Modulation) as a type of M-ary PAM in which a M-PAM (or other real modulation scheme) module modulates using M-ary Pulse Amplitude Modulation in which an output is a baseband representation of the modulated signal. As is known to those skilled in the art, the M-ary number parameter, M, is the number of points in a signal constellation and is typically an even integer and a power of 2. Baseband M-ary pulse amplitude modulation (PAM) typically uses a default signal constellation block and maps an integer m between 0 and M−1 to a value 2m−1−M.

The modulator selects and transmits one of M waveforms in response to $\log_2 M$ bits. The waveforms typically differ from each other only in amplitude. With M-PAM modulation, some skilled in the art refer to the different waveform amplitudes using the set of integers $\{A_m\}$ with $\{A_m\}$=2m−1−M, m=1, 2, ... M. $\{A_m\}$, which can be referred to as the symbol alphabet. A simple case occurs for M=2, e.g., where the symbol alphabet is {−1, +1}. For M=4 and the corresponding symbol alphabet is {−3, −1, +1, +3}.

The transmitter unit 10 includes basic transmitter circuits and uses a Fast Walsh Transform (FWT) to encode orthogonally and frequency spread transmit symbols. This provides a higher capacity than standard GMSK techniques. Typical approaches for CE-OFDM are tone based, but in accordance with a non-limiting example, an FM modulator is used to spread tones when transmitted. Of course, any tone based approach may not be as advantageous as desired, but in some instances, spreading of tones with FM modulation is adequate. Walsh functions, however, offer another level of spreading using Walsh algorithms for processing to increase robustness and to simplify the computational processing required. Thus, the transmit system spreads over more frequency and is more efficient to implement with the Fast Walsh Transform.

The transmitter unit 10 as shown in FIG. 1 includes various functional modules forming a part of the entire transmitter circuit. The unit 14 converts the data bits to one of the M M-PAM signals and can be binary or multi-level. The Fast Walsh Transform (FWT) generates the waveform and is computationally efficient such that only +/− factors are required in a circuit that could be implemented using a Field Programmable Gate Array (FPGA). The data bits can be spread over the frequency range. This is advantageous compared to modulating a single tone as is typical with many current CE-OFDM systems. A square root raised cosine filter can be used to limit the bandwidth of the waveform at the input to the FM modulator. A clipping circuit can be used to clip the waveform and reduce the peak to average power ratio of waveform prior to the phase modulator.

As illustrated by the various modules shown with the transmitter unit 10, a signal is input having its communication data into a serial-to-parallel conversion module (s/p) 12 and passed as parallel data into an M-PAM modulator 14 that generates the M-PAM symbols. This signal is then processed by a Fast Walsh Transform module 16 and up-sampled 4 (four) to about 8 (eight) times in one non-limiting example of the up-sampling circuit 18. The guard time, also called guard interval, is added by appropriate guard circuit 19, which could be different areas of the circuit. This circuit cyclically extends the output of the Fast Walsh Transform by a guard time. The signal is shaped with a Square Root Raised Cosine Filter 20 and clipped within a clipper circuit 22 and passed into the FM modulator 24. The clipper circuit 22 is an alternative or optional circuit. Once the signal is FM modulated, it is transmitted as indicated by an antenna at 26. It should be understood that in comparison to a more conventional system that processes communications data into a conventional CE-OFDM signal, on the other hand, these conventional systems for producing such CE-OFDM signals typically do not include up-sampling and do not use a square root raised cosine filter. These conventional systems also do not typically incorporate a Fast Walsh Transform (FWT) with some FM modulation.

FIG. 2 shows a receiver unit 40 and its basic processing components used for basic components of a receiver and receiving a signal transmitted by the transmitter unit 10 shown in FIG. 1 and processing such signal to obtain the transmitted communications data. As illustrated and explained in greater detail below, a demodulator circuit is operative also as a demodulator matched filter and Fast Walsh Transform circuit. Demodulator performance may benefit from standard or iterative multi-user detection (MUD) algorithms.

As illustrated, the communications signal is received through an antenna 42 as part of a receiver for a circuit forming the receiver unit 40 and down converted with an appropriate down-convert circuit 44. It is oversampled 4 to about 8 times with oversample circuit 44. Guard time removal can occur at guard circuit 43. A low pass filter 46 is operative as a band limit filter and the Frequency Domain Equalizer (FD EQU) 44 incorporates both a Fast Fourier Transform (FFT) and an Inverse Fast Fourier Transform (IFFT). Thus, in the receiver unit 40 as illustrated and explained, there is processing to the frequency domain and then back to the time domain.

The Arc-Tan circuit 50 phase demodulates the received signal and a phase unwrap circuit unwraps the output of phase demodulator and removes phase discontinuities from the signal, followed by processing within a Square Root RC filter 52 with decimation of about 2×-1×. The Fast Walsh Transform circuit 54 undoes what had been accomplished at the transmit system side concerning the Walsh modulation and is typically an inverse transform (note that an inverse Walsh transform is a fast Walsh transform). The MUD-IMUD circuit 56 operates on the received and processed signal for the multi-user detection (MUD) and iterative multi-user detection (IMUD) and is followed by parallel-to-serial processing within parallel/serial converter circuit 58.

The Fast Walsh Transform 54 is operative using adds and subtracts and there are no multiples, and thus, this circuit function can be readily implemented within a Field Programmable Gate Array (FPGA). Because there is an FFT and IFFT, the system benefits from the Fast Walsh Transform. The Frequency Domain Equalizer 48 and Multi-User Detection circuit 56 can be optional.

If Forward Error Correction (FEC) is used, there can be an iterative loop from the MUD-IMUD circuit 56 back to the FWT circuit 54 or from the MUD-IMUD circuit back to the Frequency Domain Equalizer 48 as shown by the dashed lines, indicating this is option depending on whether some type of Forward Error Correction (FEC) is used.

The transmitter unit 10 and receiver unit 40 as described have various advantages. It is possible to implement either system in Field Programmable Gate Array (FPGA) circuits. The systems build on orthogonal modulation and associated IP research, and provide a higher capacity while maintaining a constant ratio frequency (RF) envelope. The Fast Walsh Transform at the receiver unit 40 compensates for non-linear effects in any phase unwrapped circuit. The system can generate a family of waveforms providing different levels of robustness or covertness.

t should be understood that a Walsh function can form an orthogonal basis of square-integrable functions on a unit interval and can take the values −1 and 1 only, such as on sub-intervals. These Walsh functions can be used to perform a Hadamard transform, similar to the manner any orthogonal sinusoids are used to perform a Fourier transform. Typically, the order of this function is $2^s$, where $s$ is an integer meaning there are $2^s$ time intervals in which a value can be −1 or 1. Thus, a list of $2^s$ Walsh functions make the Hadamard matrix.

It should be understood that the transmitter and receiver can use the constant envelope orthogonal Walsh modulation using a Fast Walsh Transform (FWT) as described to encode orthogonally and band spread transmit symbols and provide higher capacity than standard GMSK.

It is also possible to transmit data using each orthogonal waveform as a separate channel. For example, one channel (i.e. one Walsh symbol or bin) could be used to transmit to numerous different receivers such as a broadcast channel. Another channel could be a voice channel and the composite signal of all the channels would still be constant envelope (CE). Thus, sending information on different channels for different users would still provide the desirable property of constant envelope and obtain power efficiency. Thus, Walsh bins can be used as different "channels" for control, voice, data and broadcast. Multiple channels could be used for one service (i.e. control channel) to increase robustness of channel. Even when sending different data to many users, the waveform is a constant envelope. Any received symbols in the system are processed for multiple orthogonal channels, e.g., Walsh bins. The system includes a constant radius (i.e., envelope) orthogonal Walsh (CROW) modulation and takes advantage of the channelized properties of CROW and CE-OFDM to create multiple streams of data such as the broadcast channel, digital voice channel, control channel, diversity channels, and similar channels. If there is only one channel, substantially all power or a substantial portion of the power from the transmitter could go to that user, and the waveform is still constant envelope (CE). If there are multiple channels, power is spread among all channels and users, but the waveform is still constant envelope, e.g., amplitude. This is an advantageous design.

Figure 3:
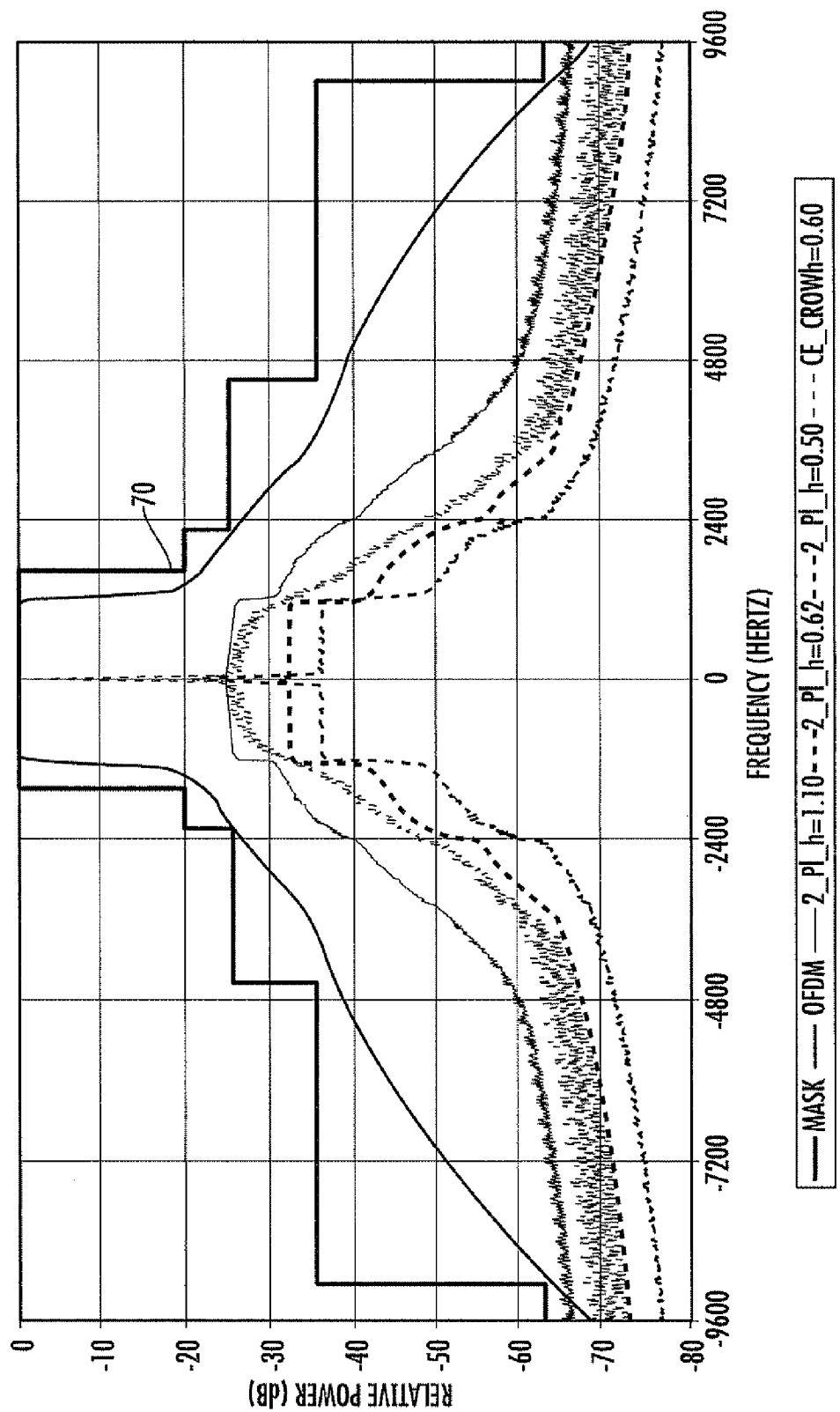
FIG. 3 is a graph showing a spectrum comparison and results for different signal examples including the constant radius orthogonal Walsh modulation in accordance with a non-limiting example of the present invention.

FIG. 3 illustrates a graph showing different spectrum comparison results and showing in the outer line at 70 the MASK as the limit for transmit power in one non-limiting aspect. As shown on the graph, some of the resulting graph lines are spread and more flat, while others are more rounded and drop off, thus indicating and showing the greater energy inside the band. It should be understood that the system provides a combination of real orthogonal modulation with FM modulation and opportunely uses the Fast Walsh Transform (FWT) modulator and a family of constant envelope (CE) waveforms in an advantageous manner.

The transmit and receive systems are applicable to Secure Personal Radio (SPR) radios such as the SPR RF-7800S radio manufactured and sold by Harris Corporation. The systems are also applicable to an Operational Tests-Tactical Engagement System (OT-TES) customers and applicable to Mobile User Objective System (MUOS) systems that typically include an array of satellites that use the Ultra High Frequency (UHF) (300 MHz to 3 GHz frequency range) satellite communications (SATCOM) systems, for example, used by the Department of Defense. Such systems can be built upon the commercial third generation (3G) Wideband Code Division Multiple Access (WCDMA) cellular phones as used with different communications systems, including military systems with UHF SATCOM radio systems and geosynchronous satellites instead of cell towers. It is also applicable to wideband networking systems such as the WNW, SRW and ANW2 such as used by Harris Corporation. As noted before, Walsh bins can be used as different "channels" for control, voice, data and broadcast.

Figure 4:
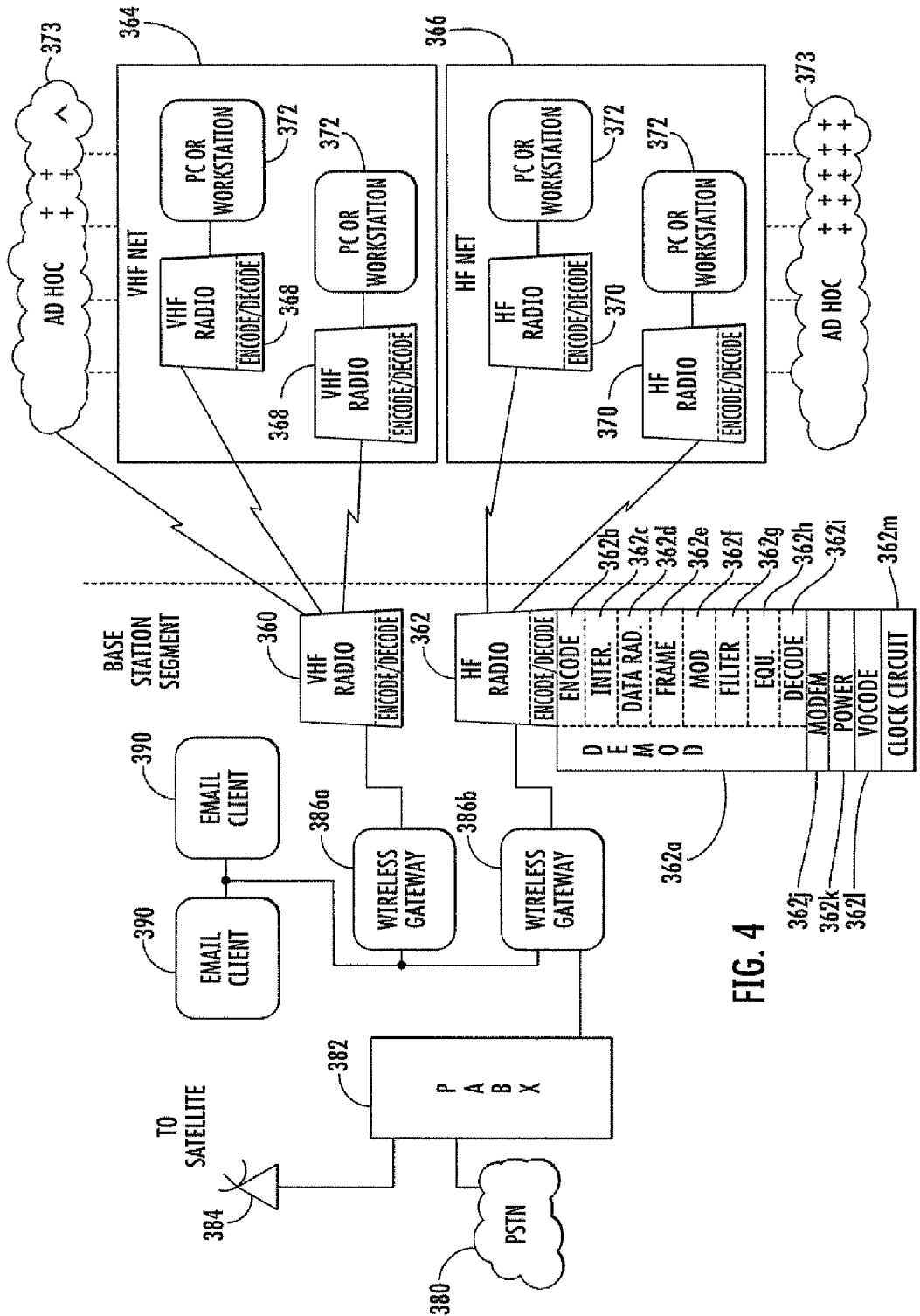
FIG. 4 is a block diagram of an example of a communications system that can be used and modified to work with constant radius orthogonal Walsh modulation in accordance with a non-limiting example of the present invention.
Figure 5:
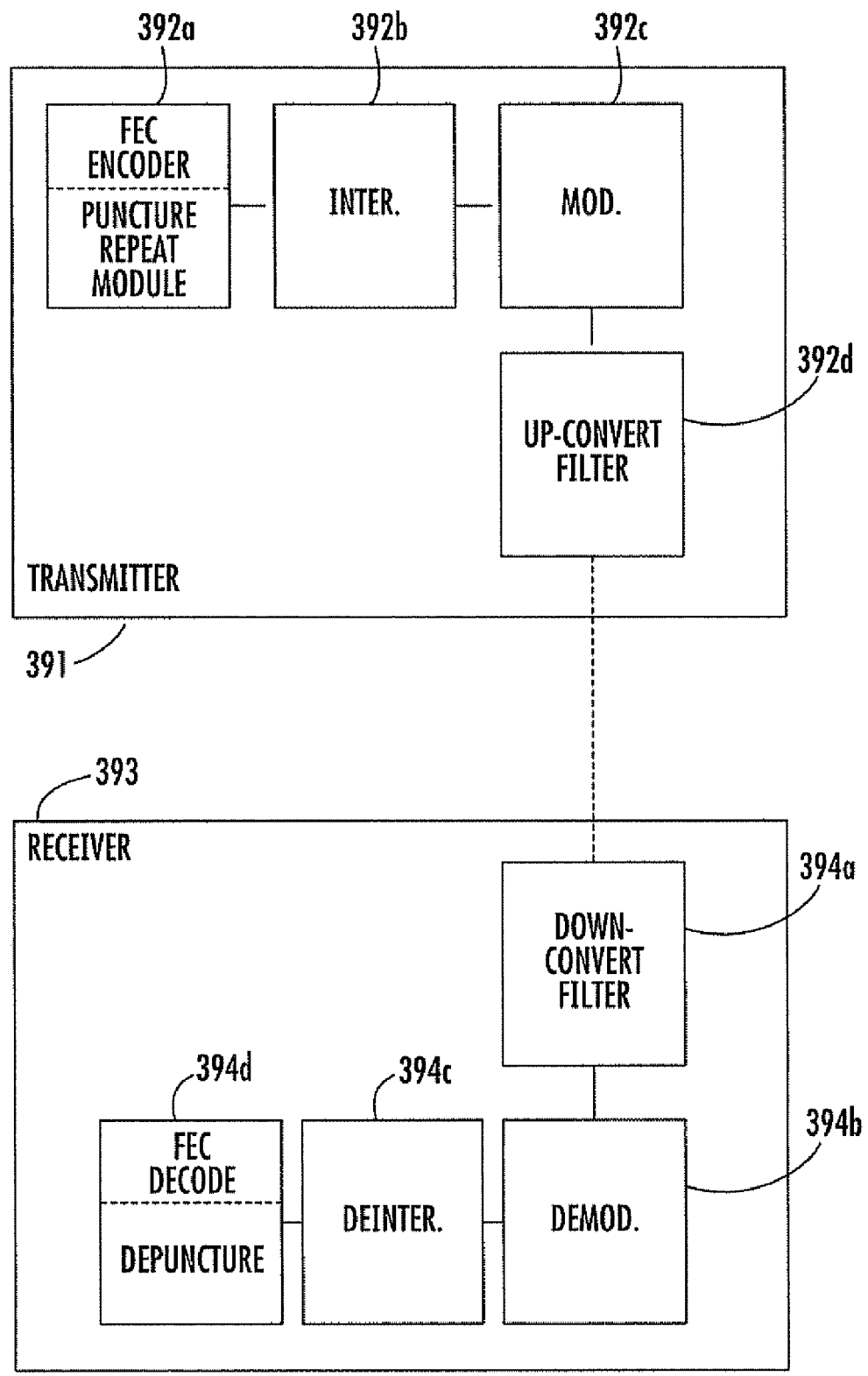
FIG. 5 is a high-level block diagram showing basic components that can be used and modified to work with the constant radius orthogonal Walsh modulation in accordance with a non-limiting example of the present invention.
Figure 6:
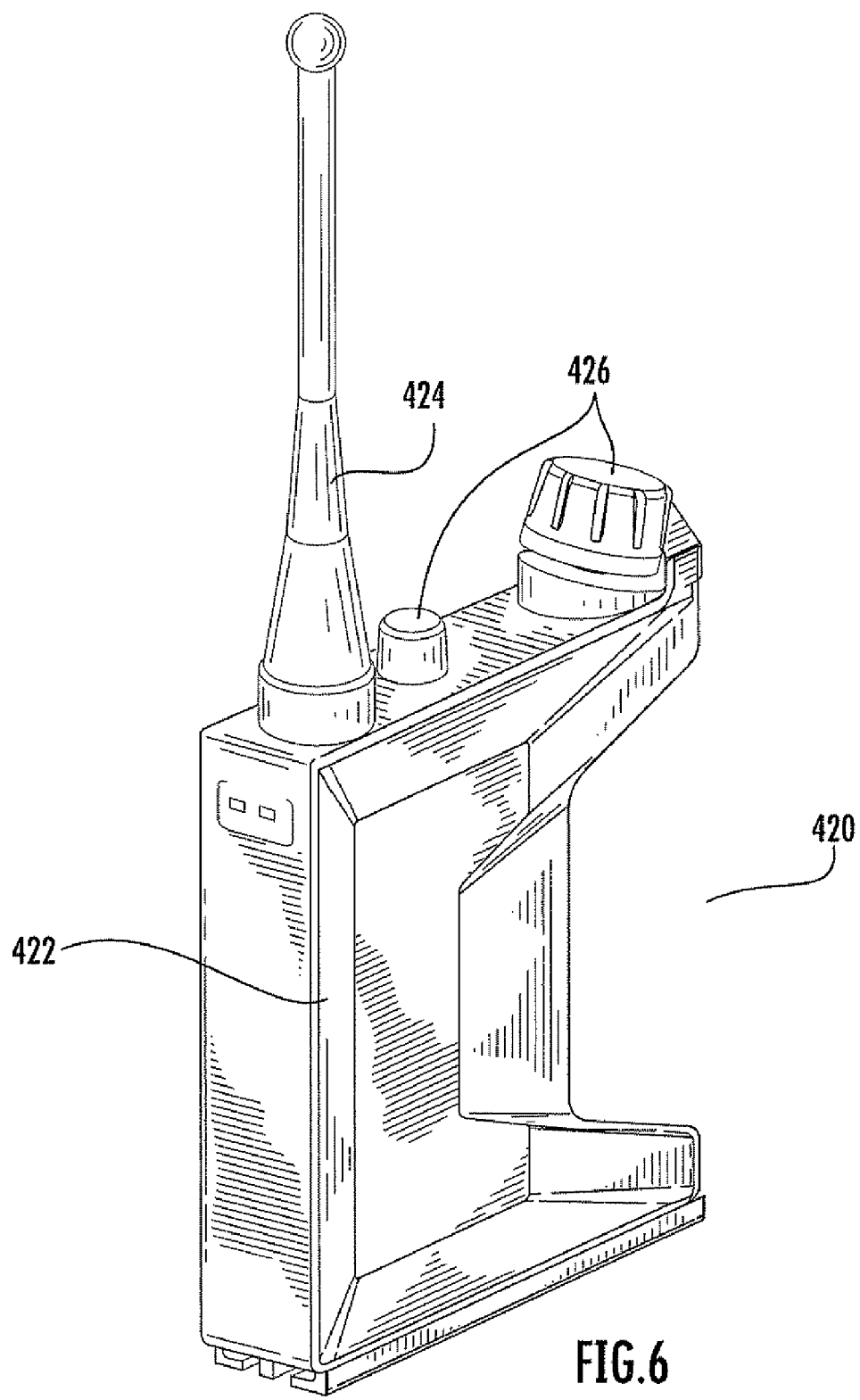
FIG. 6 is a perspective view of a portable wireless communications device as a handheld radio that could incorporate the communications system and radio as modified to work with the constant radius orthogonal Walsh modulation in accordance with a non-limiting example of the present invention.

For purposes of description, some further information on coding, interleaving, and an exemplary wireless, mobile radio communications system that includes ad-hoc capability and can be modified for use is set forth. This example of a communications system that can be used and modified for use with the present invention is now set forth with regard to FIGS. 4 and 5. FIG. 4 shows a number of radio devices that could be transmitters and receivers.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that includes communications devices that incorporate the simultaneous wideband and narrowband communications in accordance with a non-limiting example, is described relative to a non-limiting example shown in FIG. 7. This high-level block diagram of a communications system includes a base station segment and wireless message terminals that could be modified for use with the present invention. The base station segment includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368,370. Ad-hoc communication networks 373 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 362a and appropriate convolutional encoder circuit 362b, block interleaver 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder circuit 362l can incorporate the decode and encode functions and a conversion unit could be a combination of the various circuits as described or a separate circuit. A clock circuit 362m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the VHF radio 360 or HF radio 362, respectively. The processors are connected through a local area network to the PABX 382 and e-mail clients 390. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

A communications system that incorporates communications devices can be used in accordance with non-limiting examples of the present invention and is shown in FIG. 8. A transmitter is shown at 391 and includes basic functional circuit components or modules, including a forward error correction encoder 392a that includes a puncturing module, which could be integral to the encoder or a separate module. The decoder 392a and its puncturing module includes a function for repeating as will be explained below. Encoded data is interleaved at an interleaver 392b, for example, a block interleaver, and in many cases modulated at modulator 392c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 392d, which could be formed as an integrated module or separate modules. Communications signals are transmitted, for example, wirelessly to receiver 393.

At the receiver 393, down conversion and filtering occurs at a down converter and filter 394a, which could be integrated or separate modules. The signal is demodulated at demodulator 394b and deinterleaved at deinterleaver 394c. The deinterleaved data (i.e., bit soft decisions) is decoded and depunctured (for punctured codes), combined (for repeated codes) and passed through (for standard codes) at decoder 394d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a lookup table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

The system, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 420 as illustrated in FIG. 9. The portable wireless communications device is illustrated as a radio that can include a transceiver as an internal component and handheld housing 422 with an antenna 424 and control knobs 426. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the system in accordance with non-limiting examples of the present invention. An example of a communications device that could incorporate the simultaneous wideband and narrowband communications in accordance with non-limiting examples of the present invention, is the Falcon® III manpack or tactical radio platform manufactured by Harris Corporation of Melbourne, Fla.

The transmit and receive systems as described relative to FIGS. 1 and 2 can use modified OFDM. There now follows a description of OFDM as could be applied to these systems as described above. In OFDM communications systems the frequencies and modulation of a frequency-division multiplexing (FDM) communications signal are arranged orthogonal with each other to eliminate interference between signals on each frequency. In this system, low-rate modulations with relatively long symbols compared to the channel time characteristics are less sensitive to multipath propagation issues. OFDM thus transmits a number of low symbol-rate data streams on separate narrow frequency subbands using multiple frequencies simultaneously instead of transmitting a single, high symbol-rate stream on one wide frequency band on a single frequency. These multiple subbands have the advantage that the channel propagation effects are generally more constant over a given subband than over the entire channel as a whole. A classical In-phase/Quadrature (I/Q) modulation can be transmitted over individual subbands. Also, OFDM is typically used in conjunction with a Forward Error Correction scheme, which in this instance, is sometimes termed Coded Orthogonal FDM or COFDM.

An OFDM signal can be considered the sum of a number of orthogonal subcarrier signals, with baseband data on each individual subcarrier independently modulated, for example, by Quadrature Amplitude Modulation (QAM) or Phase-Shift Keying (PSK). This baseband signal can also modulate a main RE carrier.

OFDM communications systems have high spectrum efficiency (a high number of bits per second per Hz of bandwidth), simple mitigation of multi-path interference, and an ease in filtering noise. OFDM communications systems suffer, however, from time-variations in the channel, especially those which cause carrier frequency offsets. Because the OFDM signal is the sum of a large number of subcarrier signals, it can have a high peak-to-average amplitude or power ratio. It is also necessary to minimize intermodulation between subcarrier signals, which can create self-interference in-band, and create adjacent channel interference. Carrier phase noise, Doppler frequency shifts, and clock jitter can create Inter-Carrier Interference (ICI) for closely frequency-spaced subcarriers. The subcarriers are typically transmitted at assigned frequency locations within a transmission spectrum. Over the duration of the transmission of an OFDM signal, the average power per subcarrier is significant, and can be easily detected and intercepted, which is undesirable to a system requiring Low Probability of Detection (LPD) and Low Probability of Interception (LPI) characteristics. The receiver that is to receive the OFDM signal requires a minimum signal-to-noise ratio (SNR) per subcarrier in order to demodulate and decode the signal with an acceptably low bit error rate (BER). If there is other unwanted energy within the transmission spectrum, the SNR can decrease causing an increase in BER. Said unwanted energy can be unintentional noise from other sources. In this case the noise is referred to as "interference" and the sources are referred to as "interferers." If the unwanted energy corrupting the transmission is transmitted intentionally by some third party source known as a jammer, it is referred to as a jamming signal. The conventional OFDM signal is susceptible to such interferers and jammers because of the required minimum SNR per subcarrier for an acceptably low BER. Further, frequency selective fading in the channel causes transmission nulls within the OFDM signal's transmission spectrum, which selectively reduce the SNR on certain subcarriers within those nulls, depending on their frequency location, leading to an undesirable increase in BER.

Orthogonal Frequency Division Multiplexing (OFDM) is also termed Multicarrier Modulation (MCM) because the signal uses multiple carrier signals that are transmitted at different frequencies. Some of the bits or symbols normally transmitted on one channel or carrier are now transmitted by this system on multiple carriers in the channel. Advanced Digital Signal Processing (DSP) techniques distribute the data over multiple carriers (subcarriers) at predetermined frequencies. For example, if the lowest-frequency subcarrier uses a base frequency, the other subcarriers could be integer multiples of that base frequency. The particular relationship among the subcarriers is considered the orthogonality such that the energy from one subcarrier can appear at a frequency where all other subcarrier's energy equal zero. There can be a superposition of frequencies in the same frequency range. This results in a lower symbol rate on each subcarrier with less Inter-Symbol Interference (ISI) due to adverse effects of multipath. In many OFDM communications systems, a Guard Interval (GI) or Cyclic Prefix (CP) is prefixed or appended to the OFDM symbol to mitigate the effects of ISI.

Classic OFDM is based on a frequency-division multiplexing (FDM) system where each frequency channel is modulated. The frequencies and modulation of an FDM system are now orthogonal to each other to eliminate interference between channels. Because low-rate modulations with relatively long symbols compared to the channel time characteristics are less sensitive to multipath, an OFDM communications system allows a number of low-rate symbol streams to be transmitted simultaneously on multiple carriers rather than having one high-rate symbol stream transmitted on a single carrier. Thus, the frequency spectrum in an OFDM communications system is divided into multiple low-bandwidth subbands. Since each subband covers a relatively narrow section of the frequency spectrum, channel propagation effects are more constant or "flat" over a given subband compared to channel variations over the entire occupied spectrum. Any type of in-phase and quadrature (I/Q) modulation can be used to modulate any subcarrier, for example, Binary Phase Shift Keying (BPSK), Quadrature Phase Shift Keying (QPSK) or Quadrature Amplitude Modulation (QAM), or any of the numerous and different derivations of these modulation schemes. Different signal processing techniques, for example, channel coding, power allocation, adaptive modulation encoding, and similar schemes can be applied to one or more subbands. Multi-user allocation is also possible for example using time, coding, or frequency separation.

In a classic OFDM communications system, one transmitter will transmit a signal on dozens or thousands of different orthogonal frequencies that are independent with respect to the relative amplitude and phase relationship between the frequencies. Each subcarrier signal typically will have space for only a single narrowband signal because the signals are closely spaced and it is important to prevent signals on adjacent subcarriers from interfering with each other. In an OFDM system, the symbols on each subcarrier are constructed such that energy from their frequency components are zero at the center of every other subcarrier, enabling a higher spectral efficiency for OFDM symbols than is possible in classic FDM.

An OFDM system could include channel coding as a Forward Error Correction (FEC) technique, using a Forward Error Correction encoder to create a coded orthogonal FDM (COFDM) signal. Channel-State Information (CSI) techniques can also be employed, including continuous wave (CW) interferer and/or selective channel systems.

An OFDM signal is typically the sum of each of the orthogonal subcarriers. Baseband data is independently modulated onto each of the orthogonal subcarriers using some type of modulation, such as Quadrature Amplitude Modulation (QAM) or Phase Shift Keying (PSK) schemes as discussed before. Because the spectrum of each subcarrier overlaps, it can be considerably wider than if no overlap were allowed. Thus, OFDM provides high spectrum efficiency. Because each subcarrier operates at a low symbol rate, the duration of each symbol in the subcarrier is long. (For clarity, "symbol rate" is equal to the inverse of "symbol duration"). By using Forward Error Correction (FEC) equalization and modulation, there can be an enhanced resistance against a) link dispersion, b) slowly changing phase distortion and fading, c) frequency response nulls, d) constant interference, and e) burst noise. Further, the use of a Guard Interval (GI) or cyclic prefix provides enhanced resistance against multipath in the transmission channel and for the case of CROW and CE-OFDM, the guard interval allows the use of a frequency domain equalizer as shown in FIG. 2.

Typically, in OFDM communications system, a subcarrier and somewhat rectangular pulse can be employed and operative by an Inverse Discrete Fourier Transform (IDFT) using an Inverse Fast Fourier Transform (IFFT) circuit within the transmitter. At a receiver, a Fast Fourier Transform (FFT) circuit reverses this operation. The rectangular pulse shape results in a Sin(x)/x spectrum in the subcarriers.

The spacing of subcarriers can be chosen such that the received subcarriers can cause zero or acceptably low Inter-Carrier Interference (ICI) when the receiver and transmitter are synchronized. Typically, OFDM communications systems split the available bandwidth into many narrow-band subbands from as little as a few dozen to as many as eight thousand to ten thousand. Unlike the communications system providing multiple channels using classical FDM, the subcarriers for each subband in OFDM are orthogonal to each other and have close spacing and little overhead. In an OFDM communications system, there is also little overhead associated with any switching that may occur between users as in a Time Division Multiplexing Access (TDMA) communications system. Usually, the orthogonality of subcarriers in an OFDN communications system allows each carrier to have an integer number of cycles over a symbol period. As a result, the spectrum of a subcarrier has a null at the center frequency of its adjacent subcarriers.

Usually, in an OFDM communications system, the spectrum required for transmitting data is chosen based on the input data and a desired modulation scheme to be used with each carrier that is assigned the data to transmit. Any amplitude and phase of the carrier is calculated based on the modulation, for example, BPSK, QPSK or QAM as noted before. Any required spectrum is converted using the IFFT circuit to ensure carrier signals are orthogonal.

It should be understood that a FFT circuit transforms a cyclic time domain signal to an equivalent frequency spectrum by finding an equivalent waveform that is generated as a sum of orthogonal sinusoidal components. The frequency spectrum of the time domain signal is usually represented by the amplitude and phase sinusoidal components. The IFFT circuit performs the reverse process and transforms the spectrum of the amplitude and phase into a time domain signal. For example, an IFFT circuit can convert a set of complex data points into a time domain signal of the same number of points. Each complex input point will result in an integral number of sinusoid and cosinusoid cycles represented by the same number of points as were input to the IFFT. Each sinusoid known as the in-phase component, and cosinusoid known as the quadrature component, will be orthogonal to all other components generated by the IFFT. Thus, orthogonal carriers can be generated by setting an amplitude and phase for each frequency point representing a desired subcarrier frequency and performing the IFFT.

It should be understood that a Guard Interval (GI) or Guard Time, also termed a cyclic prefix, often is added to an OFDM symbol. The guard interval reduces the effects of the wireless channel on Inter-Symbol Interference (ISI) and contains redundant transmission information. Referring to the IEEE 802.11a standard as a non-limiting example, if a carrier spacing is 312.5 KHz, and the Fourier Transforms are performed over 3.2 microseconds, then a 0.8 microsecond guard interval can be applied for ISI rejection. The guard "interval" could be the last $T_g$ seconds of an active symbol period that is prefixed to an OFDM symbol, making it a cyclic prefix. It is kept short for a fraction of "T," corresponding to the total length of the active symbol, yet longer than the channel impulse response.

This helps reduce the ISI and Inter-Carrier Interference (ICI) and maintains subcarrier orthogonality. A time waveform appears periodic to the receiver over the duration of the FFT.

To reduce ICI, the OFDM symbol can be cyclically extended in the guard time to ensure that delayed replicas of the OFDM symbol can have an integer number of cycles within the FET interval, as long as the delay is smaller than the guard time. As a result, multipath signals with delays smaller than the guard time would not produce ICI.

Multipath interference is caused when multiple copies of the transmitted signal arrive at the receiver at different times. It should be understood that an OFDM communications system reduces the effect of multipath interference by providing the ability to add signal redundancy in both frequency and time by the use of various coding algorithms. For example, with the IEEE 802.11a standard using OFDM, 48 carriers can be transmitted simultaneously. The coding gain can be provided using a one-half (½) convolutional encoder at the transmitter and later a Viterbi decoder. Data bits can be interleaved across multiple symbols and carriers. Lost data often is recoverable because of interleaving across the frequency and time space.

Increasing the data rate requires an increase in the symbol rate for a fixed number of carriers, fixed modulation scheme and fixed sample rate. For a single carrier system, complex equalizers and adaptive filters are required at the receiver to compensate for the magnitude and time distortions caused by the channel. The accuracy and dynamic range required of such equalizers and filters increases markedly as symbol times are decreased. However, in an OFDM system, for example, when 48 subcarriers are transmitted simultaneously, the symbol rate is effectively reduced by 48 times, significantly reducing the requirements of channel equalizers and filters. The reduced symbol rate of an OFDM system enables a robust communication link, resistant to ISI.

It should be understood that an OFDM receiver receives a sum of the different signals as subcarriers. The addition of a guard interval can further enhance performance in an OFDM system by ensuring that no symbol transitions occur during each received symbol time. For example, if an OFDM subcarrier is BPSK modulated, there would be a 180 degree phase jump at symbol boundaries. By choosing a guard interval that is longer than the largest expected time difference between the first and last multipath signals, such phase transitions can occur only during the guard time, meaning there are no phase transitions during the FFT interval. If the phase transitions of a delayed path occur within the FFT interval of the receiver, then the summation of the subcarriers of the first path with the phase modulated waves of the delayed path would no longer produce a set of orthogonal subcarriers, resulting in a certain level of interference.

A Walsh transform can be applied to spread subcarriers over the frequency domain, in contrast with spreading over the time domain as with conventional CDMA systems. Applying a Walsh transform before any IFFT circuit can reduce average power for enhanced LPI/LPD. Various aspects of the communications system can be readily varied for improved performance. With fewer subcarriers as compared to the IFFT size and the spreading sequence length, more processing gain may be realized from frequency domain spreading. Furthermore, LPI/LPD and Anti-Jamming (AJ) performance can be enhanced, and there can be higher SNR per subcarrier. Increasing the sample rate also increases the bandwidth and data rate, and improves the LPI/LPD/AJ performance.

A Frequency Domain Spreader circuit typically operates as a matrix operation. For example, if a 64 IFFT circuit is employed, then a 64×64 Walsh Matrix (as a non-limiting example) can be used to frequency-spread the subcarriers and provide processing gain. An input vector would be multiplied by the Walsh matrix. It should be understood that a Walsh matrix is a square matrix with dimensions that can be a power of "two." The entries are positive or negative one (+1, −1). The Walsh matrix can be obtained from a Hadamard Matrix that is defined by a recursive formula of the same dimension by arranging rows such that the number of sign changes is in increasing order, i.e., sequential ordering. Each row of a Walsh matrix corresponds to a Walsh function. The ordering of rows in a Walsh matrix can be derived from ordering a Hadamard matrix by applying a bit-reversal permutation and a Gray code permutation. The Walsh functions form an orthogonal basis of a square that is integratable on a unit interval. Thus, it can generate statistically unique sets of numbers suitable for use in encryption, also known as "pseudo-random and noise codes." The multiplication may be implemented efficiently as a series of additions and subtractions.

This application is related to copending patent application entitled, "SYSTEM AND METHOD FOR COMMUNICATING DATA USING CONSTANT ENVELOPE ORTHOGONAL WALSH MODULATION WITH CHANNELIZATION," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio device, comprising:
   a transmitter unit comprising
   a modulator configured to generate M-PAM (M-Pulse Amplitude Modulation) communications symbols containing communications data;
   a Fast Walsh Transform (FWT) circuit connected to the modulator and configured to receive the communications symbols from the modulator and orthogonally encode and band-spread the communications symbols using the Fast Walsh Transform;
   a guard time circuit connected to the FWT circuit and configured to cyclically extend the output of Fast Walsh Transform circuit by a guard time; and
   a frequency modulation circuit connected to the guard time circuit and configured to frequency modulate the communications symbols wherein a constant radius orthogonal Walsh modulated communications signal containing the communications data is generated.

2. The radio device according to claim 1, and further comprising at least one of a square root raised cosine filter operative before the frequency modulation circuit for band-limiting a signal containing the communications symbols and a clipping device for reducing the peak to average power ratio of signal input to frequency modulation circuit.

3. The radio device according to claim 1, wherein said modulator comprises a circuit for generating binary or multilevel M-PAM communications symbols.

4. The radio device according to claim 1, and further comprising an up-sampling circuit that receives the signal from the FWT circuit for increasing the sampling rate on the signal containing the communications symbols.

5. The radio device according to claim 1, and further comprising a receiver unit that receives a constant radius orthogonal Walsh modulated communications signal having communications symbols containing communications data and comprising at least one of a phase demodulator circuit for phase demodulating the received signal, a phase unwrapper circuit for phase unwrapping the output of phase demodulator and a FWT circuit for performing a Fast Walsh Transform as a demodulator matched filter to obtain the communications data.

6. The radio device according to claim 5, wherein said receiver unit further comprises a multi-user detection circuit for applying standard or iterative multi-user detection algorithms to the received signal.

7. The radio device according to claim 6, wherein said receiver unit further comprises a feedback loop from the multi-user detection circuit for iterative processing.

8. The radio device according to claim 5, wherein said receiver unit further comprises a frequency domain equalizer circuit.

9. The radio device according to claim 5, wherein said receiver unit further comprises a circuit for increasing the sampling rate of the received signal.

10. A system for communicating data, comprising:
a transmitter comprising:
a modulator configured to generate M-PAM (M-Pulse Amplitude Modulation) communications symbols containing communications data;
a Fast Walsh Transform (FWT) circuit connected to the modulator and configured to receive the communications symbols from the modulator and orthogonally encode and band-spread the communications symbols using the Fast Walsh Transform;
a guard time circuit connected to the FWT circuit and configured to cyclically extend the output of the Fast Walsh Transform by a guard time;
a frequency modulation circuit connected to the guard time circuit and configured to frequency modulate the communications symbols wherein a constant radius orthogonal Walsh modulated communications signal containing the communications data is generated;
an antenna through which the communications signal is transmitted; and
a receiver remote from the transmitter that receives the constant radius orthogonal Walsh modulated communications signal and comprising at least one of a phase demodulator circuit configured to phase demodulate the received signal, a phase unwrapper circuit configured to phase unwrap the output of phase demodulator circuit and a FWT circuit configured to perform a Fast Walsh Transform as a demodulator matched filter to obtain any communications data that had been transmitted from the transmitter.

11. The system according to claim 10, wherein said transmitter further comprises at least one of a square root raised cosine filter operative before the frequency modulation circuit for band-limiting a signal containing the communications symbols and a clipping device operative before the frequency modulation circuit for reducing the peak to average power ratio of signal.

12. The system according to claim 10, wherein said modulator of said transmitter further comprises a circuit for generating binary or multilevel M-PAM communications symbols.

13. The system according to claim 10, wherein said transmitter further comprises an up-sampling circuit that receives the signal from the FWT circuit for increasing the sampling rate on the signal containing the communications symbols.

14. The system according to claim 10, wherein said receiver further comprises a multi-user detection circuit for applying standard or iterative multi-user detection algorithms to the received communications signal.

15. The system according to claim 14, wherein said receiver further comprises a feedback loop from the multi-user detection circuit for iterative processing.

16. A method of communicating data, comprising:
generating M-PAM (M-Pulse Amplitude Modulation) communications symbols containing communications data;
receiving the modulated communications symbols and orthogonally encoding and band-spreading the communications symbols using a Fast Walsh Transform;
cyclically extending the Fast Walsh Transform output by a guard time;
frequency modulating the communications symbols generate a constant radius orthogonal Walsh modulated communications signal containing the communications data; and
transmitting the constant radius orthogonal Walsh modulated communications signal to at least one receiver.

17. The method according to claim 16, which further comprises at least one of a band-limiting circuit and a clipping circuit applied to signal containing the communications symbols before frequency modulating the signal.

18. The method according to claim 17, which further comprises band-limiting the signal by filtering the signal within a square root raised cosine filter.

19. The method according to claim 16, which further comprises increasing the sampling rate in the signal containing the communications symbols after orthogonally encoding and band-spreading the communications symbols.

20. The method according to claim 16, which further comprises generating binary or multilevel M-PAM communications symbols.

21. The method according to claim 16, which further comprises receiving the constant radius orthogonal Walsh modulated communications signal within at least one receiver and phase demodulating and performing a Fast Walsh Transform as a demodulator matched filter to obtain any communications data.

22. The method according to claim 21, which further comprises processing the received communications signal at the receiver using standard or iterative multi-user detection (MUD) algorithms.

23. The method according to claim 22, which further comprises iteratively processing from a standard or iterative multi-user detection circuit back to a Fast Walsh Transform circuit or Frequency Domain Equalizer circuit.

24. The method according to claim 21, which further comprises oversampling the received communications signal at the receiver.

25. The method according to claim 21, which further comprises frequency domain equalizing at the receiver.

* * * * *